June 6, 1950     J. H. BUCKNAM ET AL     2,510,210
METHOD OF THERMOCHEMICALLY CUTTING METAL BODIES
Filed May 26, 1944     3 Sheets-Sheet 1
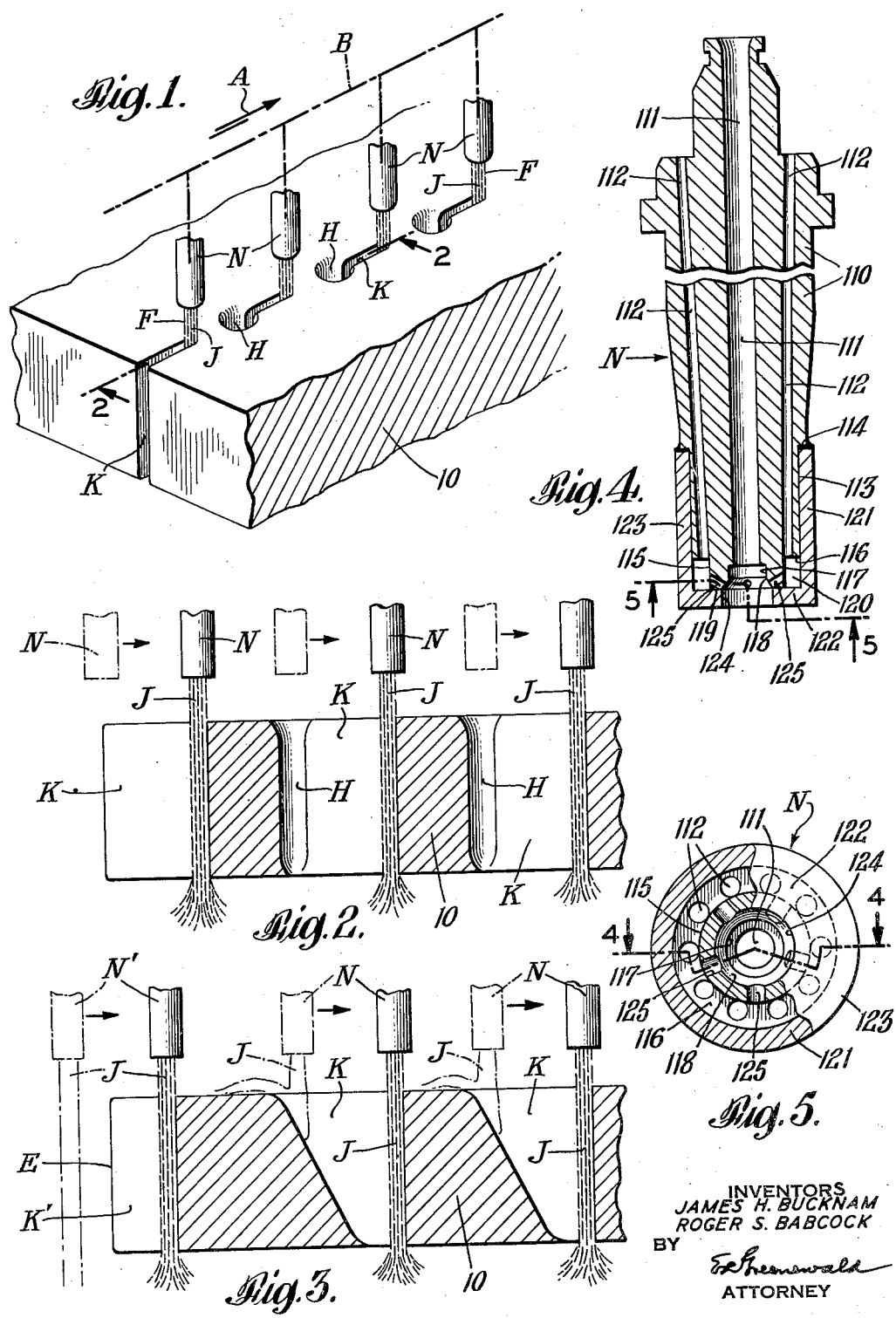
INVENTORS
JAMES H. BUCKNAM
ROGER S. BABCOCK
BY
ATTORNEY

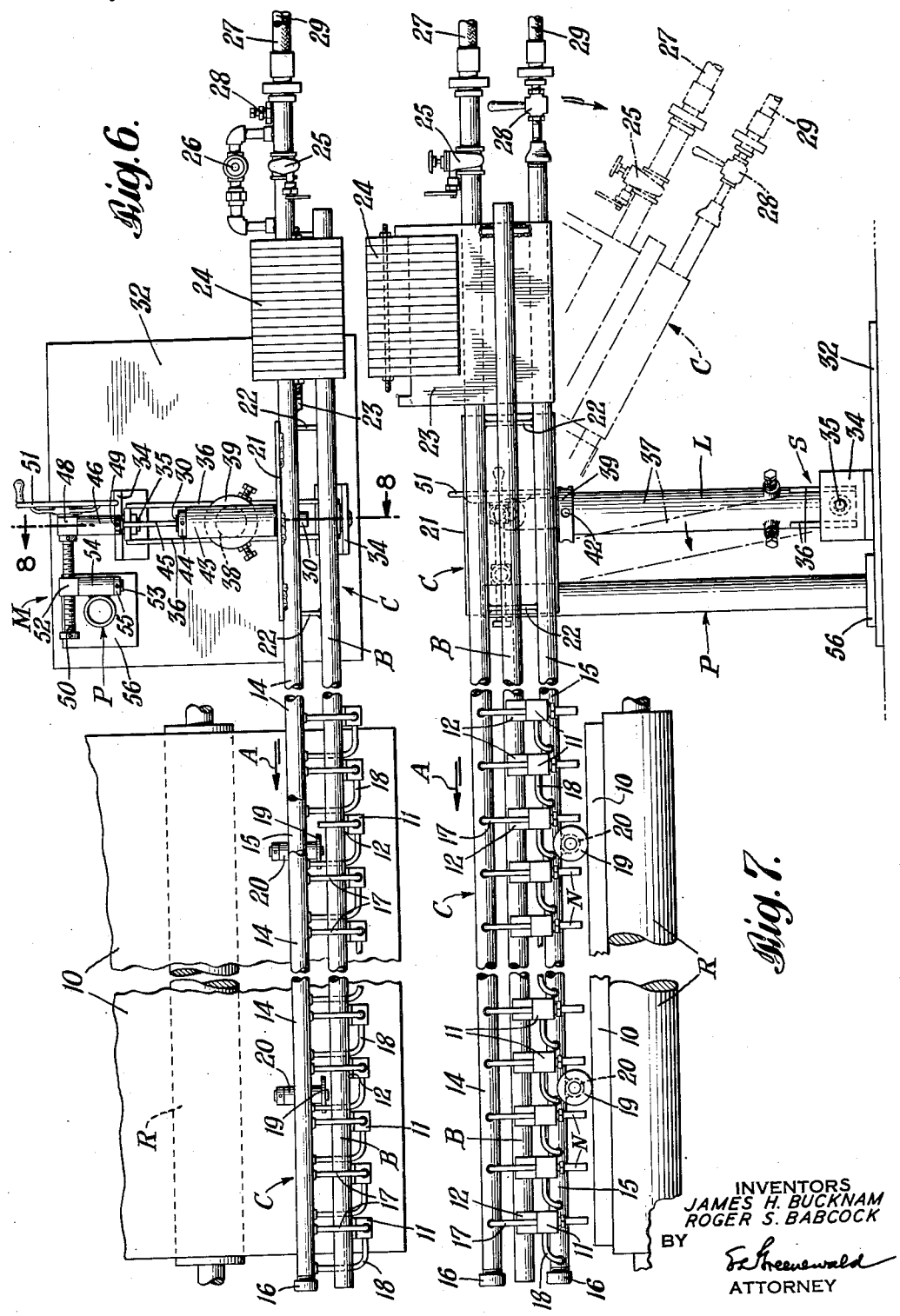

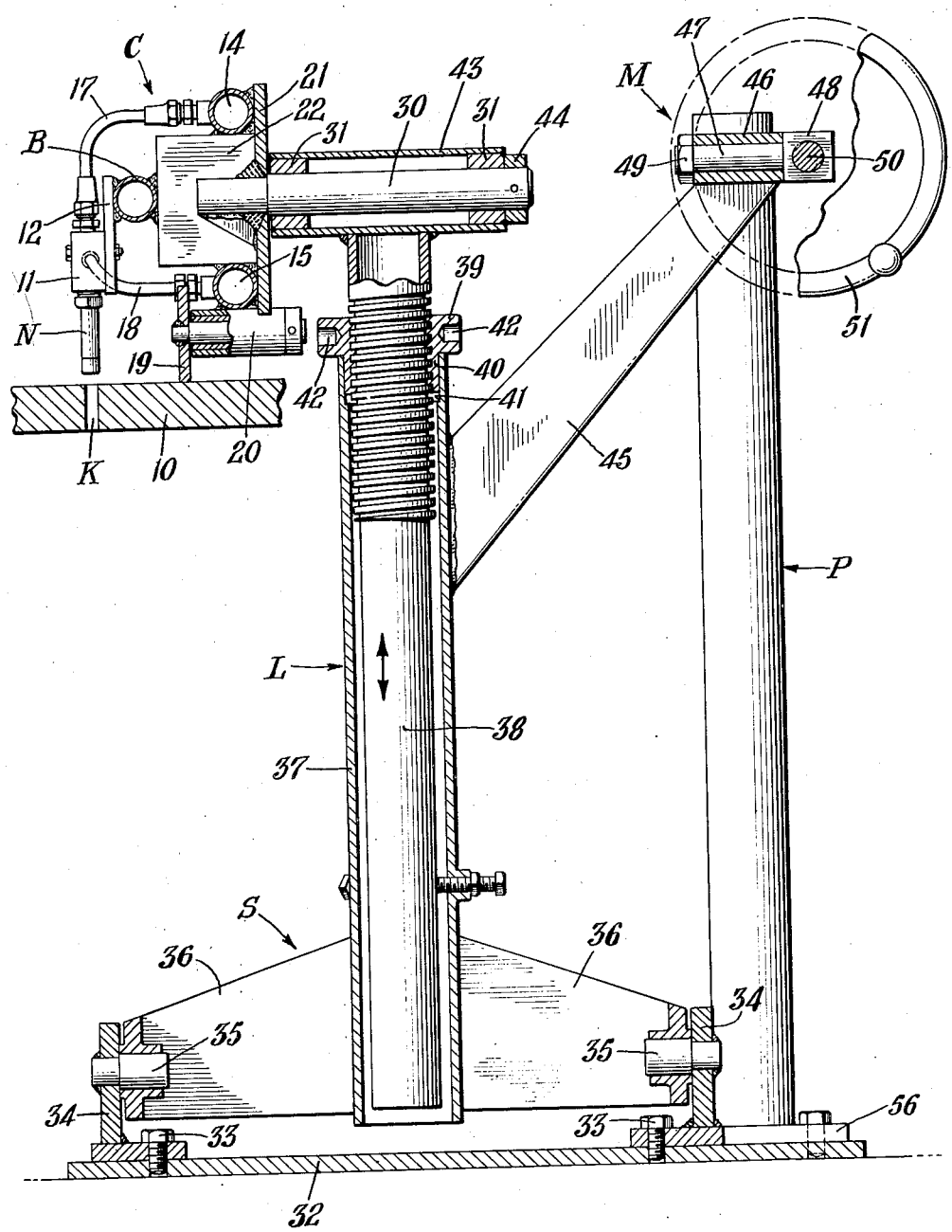

Patented June 6, 1950

2,510,210

UNITED STATES PATENT OFFICE 2,510,210

METHOD OF THERMOCHEMICALLY CUTTING METAL BODIES

James H. Bucknam and Roger S. Babcock, Cranford, N. J., assignors to The Linde Air Products Company, a corporation of Ohio Application May 26, 1944, Serial No. 537,400

3 Claims. (Cl. 148—9)

This invention relates to a method of thermochemically cutting bodies, and more particularly for rapidly severing ferrous metal slabs and the like with oxidizing gas such as commercially pure oxygen.

In steel mills it has been standard practice to sever and crop steel slabs and plates by large power shears which are expensive to construct and operate. Thermochemical methods of severing steel have found widespread use in operations where either the work or the cutting blowpipe is stationary and it is unnecessary closely to correlate the severing operation with an existing production cycle. However, the speed of severing by the customary thermochemical methods in the past has not been sufficient compared with the speed of mechanically shearing hot steel slabs and plates in course of manufacture, to avoid delaying or interfering with the production of the steel shapes in the rolling mill.

Accordingly, a principal object of the present invention is to provide a method of thermochemically cutting metal bodies which is rapid, efficient, adapted to cut a slot of minimum width, and which is especially advantageous for use in successively rapidly severing hot metal bodies such as steel slabs and plates, in process of manufacture in a rolling mill, without delaying or interrupting the production of such bodies. Other objects of the invention are to provide an improved method of cutting an elongated metal body by propelling a row of thermochemical cutting jets simultaneously along a cutting line extending across the body; an improved thermochemical cutting method which efficiently utilizes the heating and cutting gases; and a novel method of piercing and cutting relatively thick work with oxygen.

The manner in which these and other objects are attained by the invention will be apparent from the following description having reference to the accompanying drawings, in which:

Fig. 1 is a perspective view partially in section showing one method of carrying out the invention;

Fig. 2 is a sectional view taken on line 2—2 of Fig. 1;

Fig. 3 is a sectional view exemplifying a method of the invention;

Fig. 4 is a longitudinal sectional view of a nozzle taken on line 4—4 of Fig. 5;

Fig. 5 is a view partly in cross-section taken on the line 5—5 of Fig. 4;

Fig. 6 is a plan view of apparatus exemplifying the invention;

Fig. 7 is a view in elevation of the apparatus shown in Fig. 6; and

Fig. 8 is an enlarged view partly in section taken on line 8—8 of Fig. 6.

According to this invention, in thermochemically severing a steel slab or plate 10, a row of oxy-fuel gas cutting nozzles N is positioned above the plate and along the line of cut, the preheating gases are turned on and ignited to provide a row of novel post-mixed preheating flames F; and a small area on the plate directly under each nozzle is melted and thus preheated to the ignition temperature. A jet J of oxygen is then discharged by each nozzle against the molten metal in the preheated area below the nozzle and severing is accomplished by advancing the row of nozzles, with their preheating flames and oxygen jets through a single stroke of a sufficient length along a line through the preheated areas to remove the metal sections between said areas.

Further, according to the invention a method is provided which comprises preheating a metal body with a post-mixed oxy-fuel gas flame until a molten puddle is formed. Then, increasing the velocity of the oxygen component of such flame and moving the flame laterally with respect to the body to pierce the latter while the flame is moving in one direction and finally to cut a kerf in the work.

Referring to Fig. 1, the jets J of oxygen delivered by the nozzles N against the preheated areas, produce a row of holes H through the plate 10. After thus completely piercing the plate, the entire row of nozzles depending from a boom is moved as a unit in the direction of the arrow A along a line extending through the centers of the pierced holes H until the cut or kerf K made by the cutting oxygen jet of the leading nozzle reaches one lateral edge of the plate and the cut or kerf K made by the cutting oxygen jet of each of the other nozzles intersects the hole made by the oxygen jet of the next preceding nozzle in the row. This quickly completes the severing of the plate in a single pass since the length of the row of nozzles plus the distance the row is moved is equivalent to the width of the plate or the length of the cut required to sever it.

Before starting the cut, a nozzle supporting boom B, Fig. 7, is preferably positioned over the plate so that the trailing blowpipe is approximately centered over a lateral edge of the plate as is shown by the broken line representation of the nozzle N in Fig. 2. Although this arrangement is not essential if the preheating flames while being propelled are capable of heating the work to the ignition temperature, it is nevertheless desirable for purposes of conserving cutting gas during the piercing operation because gases not directed against the work are wasted.

Before the plate is completely pierced, during the interval that the row of nozzles is held stationary, products resulting from the reaction of the oxygen jets with the work leave the partially pierced holes H in a stream surrounding the jets and exert an eroding action upon the walls of the holes so pierced except for the hole cut by the trailing nozzle. After the holes are pierced completely through the plate, the products of the thermochemical action pass through the plate so that the contours of the walls of the holes have the shape shown in Figs. 1 and 2. Because the reaction products are displaced to the rear as the row of nozzles is moved forward, exerting no eroding action on the walls of the plate, the kerf between the holes is narrower than the diameter of the holes as is shown in Figs. 1 and 2 to a greatly exaggerated degree. Such severing procedure is particularly advantageous in cropping or in cutting into sections a hot steel slab or plate immediately after it has been discharged from a rolling mill and while it still is substantially at a hot rolling temperature. Thus, the severing operation is performed so rapidly that there is substantially no interference with the usual rolling mill operating time cycle.

To reduce the severing time still further and to prevent gouging by decreasing the diameter of the holes during piercing, according to the invention, instead of delaying the movement of the row of nozzles until a row of holes has been pierced completely through the plate, it is preferable in some operations simultaneously to turn on the several cutting oxygen jets and to start moving the cutting nozzles along the cutting line just as soon as the several areas on the plate surface directly under the nozzles have been fused or preheated to the ignition temperature with oxygen. Referring to Fig. 3, the piercing operation thus is initiated at the preheated areas and is completed very shortly after the row of nozzles starts to move along the cutting line; thereafter, the cutting proceeds, as previously described, by moving the row of nozzles a distance equal to the distance between the points where the oxygen jets initially pierce entirely through the plate. The reason the slots in Fig. 3 are of smaller diameter during piercing than is the case in Figs. 1 and 2, as mentioned above, is because the hot slag formed during piercing is blown out as shown by the dotted lines in Fig. 3 at only one side of each of the moving gas streams instead of around each of such streams, as is the case in Figs. 1 and 2. The eroding action of the hot slag enlarges the hole on all sides in Figs. 1 and 2, but on only the rear or lagging side in Fig. 3. A preferred slope for the base of each slot during piercing is about that shown in Fig. 3, i. e. substantially 30° to the vertical. As in the case of Fig. 2, the broken lines, represent the starting position of the nozzles N. Because no appreciable time interval exists during which the trailing cutting nozzle is not directed against the work, the starting position of the trailing nozzle with respect to a lateral edge E of the work 10 is of small importance so far as the conservation of cutting gas is concerned.

As can be seen from Fig. 3 the cut K′, made by the trailing cutting nozzle differs from the cuts K made by the other nozzles in that the cutting jet of nozzle N′ cuts the plate through its entire thickness from the start of the cutting operation. The advance of the row of nozzles in this modified procedure results in a kerf of substantially uniform width and additionally provides a useful path of escape for the oxygen jets before they pierce through to the bottom of the plate and, therefore, the spread of the cutting jets and resulting lateral gouging is inhibited.

Either of such rapid severing procedures may be accomplished by mounting a row of cutting nozzles N on the boom B constructed and arranged to be positioned above and parallel to the cutting line on the plate 10. The cutting nozzles N on the boom are movable as a unit in a straight line, and are spaced apart a suitable distance to synchronize the cutting stroke and time with the rolling mill time cycle. For example, if a cutting time of ten seconds is allowable, and the actual cutting rate of a single cutting oxygen jet is 30 inches per minute, the centers of the nozzle should be spaced five inches apart.

Apparatus for carrying out the invention comprises a carriage C mounted on a support S and positioned transversely of the slab 10 to be cut. On the carriage C is mounted the boom B which supports the row of the nozzles N, the number of said nozzles being governed by the time allowed for severing and the width of the plate. Associated with the carriage is a mechanism M capable of propelling the carriage in the direction of a line extending through the centers of the holes H pierced by the cutting jets and for a distance sufficient in one stroke to remove the metal from the spaces between the holes. To facilitate the operation, means are provided for retracting the nozzle away from the plate, for valving the various fluids in their proper sequence, and for protecting the nozzles and machine parts from reflected heat or slag by air screens, baffles, or water cooling.

Referring to the drawings and particularly to Figs. 6, 7, and 8, the carriage C is arranged transversely over the plate 10 resting on conveyor rollers R. At intervals along the length of the carriage C nozzle blocks 11 are mounted, each nozzle block supporting a nozzle N the tip of which is a short distance above the plate 10. By means of a bracket 12 the nozzle blocks 11 are secured to the boom B which comprises one of the longitudinal members of the carriage C. Running parallel to the boom B are an oxygen manifold 14 and an acetylene manifold 15. The down stream or outer end of the oxygen manifold 14 and acetylene manifold 15 are each sealed by caps 16, 16. Supplying the nozzles with the appropriate gases are oxygen tubes 17 and acetylene tubes 18, each connected to its respective manifold. At suitably spaced intervals along the carriage are wheels 19 which are mounted on bearings 20 attached to the acetylene manifold 15.

Near the upstream end of the oxygen manifold 14 and acetylene manifold 15, a mounting plate 21 is welded or otherwise fastened to the side of such manifolds opposite the nozzles N. Braces 22 welded to the boom B, the oxygen manifold 14, and the acetylene manifold 15 rigidly hold these three longitudinal members in spaced relation to one another. A plate 23 is welded or otherwise secured to the acetylene and oxygen manifolds on the side of the carriage C opposite the nozzles N to support counterweights 24 which counterbalance the weight of the nozzle-carrying portion of the boom. The oxygen manifold 14 has near its inlet end a gate valve 25 which is by-passed by a line having a globe valve 26 and is connected to an oxygen supply line 27. The acetylene manifold 15 is similarly provided with an acetylene valve 28 and is connected to an acetylene supply line 29.

Rigidly and perpendicularly secured to the mounting plate 21 is a horizontal shaft or pivot 30 as shown in Fig. 8. The pivot 30 is adapted to engage a bearing 31 mounted on the carriage support S. The support S rests on a base 32 mounted on the floor adjacent the plate or slab conveyor. Such base may be a piece of steel plate or other material capable of supporting the apparatus and is threaded to receive bolts 33 for clamping two angles 34, 34, the latter being spaced apart transversely of the carriage C. Held by the oppositely disposed angles 34 are trunnions 35 serving as the lower support for an adjustable crank or link L. The lower end of the link L has laterally extending webs 36 which serve to span the distance between the trunnions 35 and the adjustable link L. The webs 36 are journalled on the trunnions 35. The adjustable link L consists of a tubular sleeve 37 within which is disposed a spindle 38 threaded at its upper end and guided at its lower end. A nut 39 engaging the spindle 38 is rotatably secured to the upper end of the sleeve 37 by an extension 40 within a recess 41 at the upper end of the sleeve. Several holes 42 are drilled in the nut 39 to accommodate a spanner wrench for changing the length of the adjustable link by rotating the nut. Welded or otherwise fastened to the top of the spindle 38 is a horizontal tubular member 43 having secured therein at each end the two bearings 31, 31. The bearings 31, 31 carry the pivot 30 which has secured on one end a collar 44 outside of one bearing 31 and which is, at its other end, welded to the mounting plate 21.

Both motion and support are imparted to the carriage C by an upwardly extending inclined arm 45, one end of which is secured to the sleeve 37 and the other end to a bearing 46 of the propelling mechanism M. Journalled within the bearing 46 is a pin 47 extending from a bored block 48 and held against longitudinal movement by a nut 49. A threaded rod 50 having a handwheel 51 passes through the hole of the block 48, which hole forms a bearing for a threadless shank portion of the rod 50. The threaded portion of the rod 50 engages threads of a threaded block 52 having a horizontally extending pin 53 which is journalled in a bearing 54, the pin being secured against longitudinal movement by a collar 55. The bearing 54 is secured to the upper end of a post P in parallel relation to the bearing 46. The post P in turn has a flange 56 at its lower end which is secured to the base 32 adjacent one of the angles 34.

While the cutting blowpipes and their nozzles N may in certain cases be of the conventional type employed for flame cutting metal, special advantages such as stability and freedom from flashback and backfire are obtained in the herein-disclosed severing method by using an improved post-mixed flame cutting nozzle, such as that shown in Figs. 4 and 5.

According to this invention, and as shown by way of example in Figs. 4 and 5, each cutting nozzle N is constructed to provide a cutting oxygen stream as well as a combustible preheating mixture of oxygen and acetylene, as these gases are discharged from the nozzle, instead of mixing the acetylene and preheating oxygen within the blowpipe or the nozzle to produce such preheating mixture. As shown, the nozzle N comprises a main body 110 which has a central oxygen passage 111 extending longitudinally therethrough, and also has a plurality of longitudinally extending acetylene passages 112 arranged in a row spaced radially from the oxygen passage 111.

The rear end of the body 110 and the inlet ends of the passages 111 and 112 are constructed and arranged in a conventional manner to couple the nozzle to a suitable blowpipe head adapted to supply oxygen under pressure to the passage 111 and acetylene under pressure to the passages 112. At its front end, the cross-section of the body 110 is reduced to provide a cylindrical surface 113 and an annular shoulder 114, and is further reduced to provide a second cylindrical surface 115 and a second annular shoulder 116.

At its discharge end, the oxygen passage 111 is counterbored to provide a short enlarged cylindrical passage section 117 and a short flaring or frusto-conical passage section 118, the latter extending from the cylindrical section 117 to the front end or face 119 of the body 110. The acetylene passages 112 terminate at the shoulder 116 and open into an annular acetylene distributing chamber 120. The two outer sides of the distributing chamber 120 are provided by the skirt 121 and the inturned flange 122 of an end cap 123. The skirt 121 tightly fits the cylindrical surface 113 and abuts against and is soldered to the shoulder 114. The flange 122 bears gas tightly against the end of body 110, and its inner edge 124 is substantially the same diameter as and coaxial with the larger diameter of the frusto-conical passage section 118, and thus provides the sole discharge orifice of the nozzle.

A number of short forwardly inclined passages or ports 125 extend from the surface 115 to the frusto-conical passage section 118, whereby acetylene is discharged from the distributing chamber 120 into the central passage and obliquely against the oxygen stream flowing therethrough. The row of acetylene jets, thus discharged forwardly obliquely against the periphery of the outwardly flowing oxygen stream, mix with a peripheral layer of said stream to form a sheath of combustible preheating gas encircling the oxygen stream; and the latter, preferably having a greater pressure and velocity than the acetylene jets, exerts an ejector action to draw the acetylene against its surface; and the flow of the gases through the central cylindrical opening in the cap 123 aids further in providing the sheath of combustible gas around the cutting oxygen stream.

Because of this particular structure the length of the preheat flame at the tip of the nozzle is greatly extended in contrast to the flame of the premixed type of nozzle. The advantages of this extended preheat flame render post-mixed nozzles especially applicable for hot plate cutting because the tips of the nozzles may be positioned more distant from the hot plate and are thus located in a less destructive environment. During the cutting operation greater stability, that is, ability to maintain the temperature of the plate sufficiently high for continuous cutting at the point where the cutting gas impinges upon the work, also results because the preheat flame extends sufficiently deep within the kerf cut in the plate.

In operation, the plate or slab 10 is supported and advanced by the rolls R up to the point where it is to be severed. Carriage C is swung down about the pivot 30 to a horizontal operating position over the slab, and the nozzles N are positioned transversely by rotation of handwheel 51 until they are in starting position. The nut 39 may be turned by a spanner wrench to regulate the length of the adjustable link L to a height sufficient to maintain the carriage C horizontal and parallel with the surface of the plate 10. The gate valve 25 on the oxygen manifold is maintained closed. The globe valve 26 in the by-pass about the gate valve 25 is adjusted together with the acetylene valve 28 to provide the proper preheat flame at the nozzles. The gases issue from the nozzle N, desirably mix at the nozzle ends, and are ignited, as by the heat of the hot slab. The resulting post-mixed flames F preheat a row of spaced areas on the plate 10. When such areas have been sufficiently preheated, which requires only a very short time, the main oxygen valve 26 is opened to provide the oxygen jets J for piercing the slab. The preheat flames continue burning in order to provide sufficient heat at the top of the kerf to assist the thermochemical reaction of the oxygen jets with the metal.

Depending upon the selected cutting procedure, immediately or when the reaction has progressed sufficiently to completely pierce the plate 10, handwheel 51 is turned to move the jets relatively to the plate 10 along a line extending through the centers of the pierced areas as indicated by the arrow A in Figs. 6 and 7, the rate of turning being sufficient to maintain a rapid cutting action to cut through the metal sections between the pierced areas. As the handwheel 51 is rotated, the threaded rod 50 advances through the rigidly held threaded block 52 and pulls the block 48 toward the block 52. The movement of the bored block 43 is transmitted by the bearing 46 and arm 45 to the adjustable link L to swing or tilt it with respect to the plate 10, and horizontally move the carriage C at a regulated cutting speed. As the carriage C, supported on the wheels 19, moves transversely of the surface of the plate 10, the adjustable link L slowly pivots on the trunnions 35 toward a position indicated by the broken lines of Fig. 7. As the vertical height of the adjustable link gradually decreases, the extension 40 of the nut 39 slides outwardly in the recess 41 of the sleeve 37 to maintain the carriage C in a horizontal position. At the end of the severing operation the carriage C may be swung upwardly about the pivot 30 to lift the entire carriage and the blowpipes thereon away from the severed plate 10. This retracted position is shown by the broken line representation of the right hand end of carriage C in Fig. 7. As shown in Figs. 6 and 7 only two valves are needed when postmixed nozzles are used, there being one valve for the oxygen and one for the fuel gas, whereas when pre-mixed nozzles are used at least two valves are usually provided on each nozzle.

As previously explained, the herein disclosed severing method and apparatus of Figs. 4 to 8 are especially useful in successively and rapidly severing elongated relatively thick metal bodies, such as steel plates, slabs, etc. to crop or cut them into sections while they are hot and in transit through mill production equipment, as between a rolling mill and other processing means, and in synchronism with the production cycle. It will be understood that any suitable fuel gas other than acetylene may be utilized and that oxygen or mixtures containing oxygen may be utilized for the combustion-supporting and metal-removing gas streams respectively. The particular embodiments herein described and illustrated in the drawings, are presented to indicate how the invention may be applied.

The reason the post-mixed nozzles are better adapted for severing thick work is because, as stated above, the post-mixed flame is longer than the pre-mixed flame. In the prior patent of Barnes et al. 2,356,196, dated August 22, 1944 (filed March 30, 1940), page 5, column 1, line 32, the post-mixed flame is said to be more nearly uniform in temperature throughout than is the pre-mixed flame, which is hottest at the tip of the inner cone. These characteristics enable the post-mixed nozzle to be held a greater distance from the work when cutting than can the pre-mixed nozzle, as mentioned above. If the pre-mixed nozzle were held as far away from the work as can the post-mixed nozzle, the pre-mixed nozzle would be less stable, i. e. in danger of losing the cut with relative movement between the work and nozzle, unless the rate of such relative movement were greatly reduced. Holding a pre-mixed cutting nozzle close enough to the adjacent surface of a thick body of work has two disadvantages that a post-mixed nozzle does not have. These are the greater danger of of backfire with a pre-mixed nozzle and the fact that any preheating is not the same at a great depth or distance from the nozzle. With these characteristics in mind, it may now be appreciated in the process of Fig. 3 that as a post-mixed nozzle N moves into that portion of the work where the effective depth decreases, i. e. in that portion where the upper surface is the inclined base of the slots, the effect is the same as if the separation between the work and nozzle were increased. As a result, there is danger of losing the cut, unless a post-mixed nozzle is used, or unless the rate of relative movement of thick work past a pre-mixed nozzle is greatly reduced. With a post-mixed nozzle, rapidity of cutting may be maintained.

What is claimed is:

1. A method of rapidly transversely severing an elongated metal body which is of substantial width and of substantially rectangular cross-section, such as a steel plate or slab, while such body is supported horizontally, such method comprising providing a horizontal row of rectilinearly movable post-mixed flame cutting nozzles equally spaced apart; correlating the number of nozzles so provided and the distance they are spaced apart with the width dimension of such body and the time interval available in a production cycle for completely transversely severing the body by a single advance or stroke of said row of nozzles transversely of said body; positioning said row of nozzles so that the cutting flame orifices of the nozzles are opposite and generally parallel to a horizontal cutting line on the upper horizontal surface of a body to be cut and also so that the flame of the leading nozzle of such row of nozzles is directed at an area on said cutting line that is axially spaced from a leading lateral edge of said body a distance equal to the axial distance said nozzles are spaced apart; applying preheating flames from said nozzles above said surface to spaced areas on said surface along said cutting line; applying cutting oxygen jets from such nozzles against such preheated areas to begin piercing said body, cutting a plurality of alined and separate kerfs through said body during the piercing operation; upon completion of piercing through said body, moving said row of nozzles and the preheating flames and cutting jets thereof only a single stroke substantially equal to the distance adjacent nozzles are spaced apart and horizontally and transversely of said body solely toward its leading lateral edge, until the cutting jet from the orifice of said leading nozzle cuts a kerf extending through said lateral edge and until such alined kerfs entirely through the body merge end to end; and then shutting off said preheating flames and said oxygen cutting jets.

2. A method of cutting a metal body of thick hot steel, which comprises simultaneously directing aligned and spaced ignited jets of post-mixed fuel gas and oxidizing gas against spaced areas of said body; upon attaining the kindling temperature of said body, substantially simultaneously increasing the flow of oxidizing gas in said post-mixed jets in excess of the amount required to support combustion of said fuel gas; thereby reacting with said body an excess oxidizing gas issuing from said jets; and thereupon before any of said jets have pierced said body relatively moving said jets and said body in a single pass in the direction of a line extending through the centers of said areas and for a distance sufficient to react with the metal sections between said areas and entirely sever said body.

3. A method of piercing and cutting a wide, thick, hot body of metal comprising substantially uniformly spacing a plurality of post-mixed preheat flames in alignment across said body when the same is below the ignition temperature of the metal and oxygen, flowing cutting oxygen to said flames while effecting relative movement between said body and said plurality of flames in only one direction of the flame alignment during both piercing and cutting of said body, continuing said relative movement after said body has been pierced and until the body has been severed, and then shutting off the preheat flames and cutting oxygen.

JAMES H. BUCKNAM.
ROGER S. BABCOCK.

REFERENCES CITED

The following references are of record in the file of this patent:

UNITED STATES PATENTS

| Number | Name | Date |
| --- | --- | --- |
| 703,940 | Menne | July 1, 1902 |
| 1,084,692 | Bucknam | Jan. 20, 1914 |
| 1,136,490 | Smith | Apr. 20, 1915 |
| 1,311,815 | Harris | July 29, 1919 |
| 1,345,242 | Reynolds | June 29, 1920 |
| 1,352,381 | Reynolds | Sept. 7, 1920 |
| 1,519,582 | Harris | Dec. 16, 1924 |
| 1,554,408 | Coberly | Sept. 22, 1925 |
| 1,698,173 | Royer | Jan. 8, 1929 |
| 1,709,886 | Smith | Apr. 23, 1929 |
| 1,879,346 | Lawrence | Sept. 27, 1932 |
| 2,175,160 | Zobel | Oct. 3, 1939 |
| 2,195,384 | Zobel | Mar. 26, 1940 |
| 2,221,788 | Doyle | Nov. 19, 1940 |
| 2,345,412 | Moore | Mar. 28, 1944 |
| 2,417,412 | Herbst | Mar. 18, 1947 |
| 2,425,709 | Bucknam et al. | Aug. 19, 1947 |

FOREIGN PATENTS

| Number | Country | Date |
| --- | --- | --- |
| 701,786 | France | Mar. 23, 1931 |

OTHER REFERENCES

The Oxy-Acetylene Handbook, copyright 1943, pages 458 and 460.